US012139914B2

(12) United States Patent
Nielsen et al.

(10) Patent No.: US 12,139,914 B2
(45) Date of Patent: Nov. 12, 2024

(54) CONNECTOR ARRANGEMENT AND A METHOD FOR WEATHER PROOFING A ROOF WINDOW ARRANGEMENT

(71) Applicant: VKR Holding A/S, Hørsholm (DK)

(72) Inventors: Thomas Nør Nielsen, Horsens (DK); Torben Krogsgaard Allesen, Horsens (DK); Jesper Uldum Svaneborg, Tranbjerg J (DK)

(73) Assignee: VKR Holding A/S (DK)

( * ) Notice: Subject to any disclaimer, the term of this patent is extended or adjusted under 35 U.S.C. 154(b) by 295 days.

(21) Appl. No.: 17/405,391

(22) Filed: Aug. 18, 2021

(65) Prior Publication Data

US 2022/0064957 A1 Mar. 3, 2022

(30) Foreign Application Priority Data

Aug. 26, 2020 (DK) ........................... PA 2020 70552

(51) Int. Cl.
*E04D 3/366* (2006.01)
*E04D 13/03* (2006.01)
(Continued)

(52) U.S. Cl.
CPC ......... *E04D 13/0722* (2013.01); *E04D 3/366* (2013.01); *E04D 13/031* (2013.01);
(Continued)

(58) Field of Classification Search
CPC ....... E04D 3/366; E04D 3/38; E04D 13/0305; E04D 13/031; E04D 13/0315;
(Continued)

(56) References Cited

U.S. PATENT DOCUMENTS 9,482,009 B2 * 11/2016 Krogsgaard ........ E04D 13/1475
11,002,016 B2 5/2021 Allesen
(Continued)

FOREIGN PATENT DOCUMENTS

EP 3039198 7/2016
EP 3282064 2/2018
(Continued)

OTHER PUBLICATIONS

European Search Report dated Nov. 15, 2021 issued in connection with European Patent Application No. EP 21193111, five (5) pages.
(Continued)

*Primary Examiner* — Jessica L Laux
(74) *Attorney, Agent, or Firm* — Merek, Blackmon & Voorhees, LLC

(57) ABSTRACT

A connector arrangement for a flashing assembly for use in a roof window arrangement is disclosed. It comprises a base connector element, an elevation element and a top connector element. Both connector elements have a gutter in their exterior side, and the gutter is open at one end so that water can drain out of it. An attachment section on the interior side of the base connector element is configured for being attached to a bracket used for connecting a roof window to a load-bearing structure, and the elevation element supports the top connector element so that it is positioned above the base connector element. In the mounted state the second end of the top connector element is arranged above the gutter of the base connector element and their length directions
(Continued)

extend substantially in parallel to each other. A method for weather proofing a roof window arrangement is also disclosed.

19 Claims, 7 Drawing Sheets

(51) Int. Cl.

| | |
|---|---|
| ***E04D 13/064*** | (2006.01) |
| ***E04D 13/068*** | (2006.01) |
| ***E04D 13/072*** | (2006.01) |
| ***E04D 13/147*** | (2006.01) |

(52) U.S. Cl.
CPC ..... *E04D 13/0641* (2013.01); *E04D 13/0685* (2013.01); *E04D 13/1475* (2013.01); *E05Y 2900/154* (2013.01)

(58) Field of Classification Search
CPC .............. E04D 13/032; E04D 13/0335; E04D 13/0722; E04D 13/1475; E04D 13/1473; E04D 13/147; E04D 13/1415; E04D 13/1407
See application file for complete search history.

(56) References Cited

U.S. PATENT DOCUMENTS

| | | | | |
|---|---|---|---|---|
| 2004/0226225 | A1 | 11/2004 | Olk et al. | |
| 2014/0366468 | A1* | 12/2014 | Lindgren | E04D 13/031 52/200 |
| 2020/0224420 | A1* | 7/2020 | Nygaard | E04D 13/0354 |
| 2020/0224421 | A1* | 7/2020 | Allesen | E04D 13/031 |
| 2020/0224425 | A1* | 7/2020 | Allesen | E04D 13/031 |
| 2022/0064957 | A1* | 3/2022 | Nielsen | E04D 3/366 |

FOREIGN PATENT DOCUMENTS

| | | |
|---|---|---|
| EP | 3680416 | 7/2020 |
| EP | 3039201 | 7/2021 |
| JP | S59115093 | 8/1984 |
| WO | WO2015/028030 | 3/2015 |

OTHER PUBLICATIONS

Danish Office Action dated Feb. 22, 2021 issued in connection with Danish Patent Application No. PA 2020 70552, eight (8) pages.

* cited by examiner

CONNECTOR ARRANGEMENT AND A METHOD FOR WEATHER PROOFING A ROOF WINDOW ARRANGEMENT

TECHNICAL FIELD

The present invention relates to a connector arrangement for a flashing assembly for use in a roof window arrangement, said connector arrangement comprising a base connector element configured for being arranged with an exterior side facing the exterior in the mounted state, an interior side opposite the exterior side, and a length direction of the base connector element extending from a first end towards a second end, where the exterior side comprises a base gutter with two longitudinal edges extending between the first and second ends, where the base gutter is open at the second end so that water can drain out of the base gutter, and where an attachment section on the interior side is configured for being attached to a bracket used for connecting a roof window to a load-bearing structure. The invention further relates to a method for weather proofing a roof window arrangement using such a connector arrangement.

BACKGROUND ART

Connector arrangements of this type are known for example from EP3039198 and EP3680416. They serve to attach and interconnect cover and flashing members of the flashing assembly and the base gutter is used to drain off water penetrating through the flashing assembly or condensing at these interconnections. The connector arrangements are used both between windows mounted side-by-side and at the ends of the window arrangements, where cover and flashing members of the flashing assembly extending along the side of the outermost window in the window arrangement are connected to cover and flashing members extending along the top and bottom of the outermost window. In this context the term "top" indicates the part of the roof window, which is located highest when seen in the direction of slope, and the term "bottom" indicates the part of the roof window, which is located lowest when seen in the direction of slope, the typical slope of roof window arrangements where connector arrangements have been used being at least 5 degrees. The slope is defined by the slope of the panes of the roof windows in the mounted and closed state of the windows.

While the prior art connector arrangements have worked very well, it has remained a problem to achieve a reliable and cost-efficient weatherproofing where a roof window arrangement is installed with the tops of the roof windows in close proximity to a wall, the exterior surface of which extends at an angle of less than 180 degrees in relation to the exterior surface of the panes of the roof windows. A particular problem has been that the prior art connector arrangements have not been able to sufficiently compensate for tolerances in the installation of the roof windows and irregularities of the wall.

SUMMARY OF INVENTION

With this background, it is an object of the invention to provide a connector arrangement with which it is possible to facilitate the installation of roof window arrangement, where the tops of the roof windows are to be mounted in close proximity to a wall. A particular object is to provide a connector arrangement, which can be used with a range of the different mutual angles between the roof window slope and the surface of the wall and/or with a range of the different distances between the roof windows and the surface of the wall.

This and further objects are achieved with a connector arrangement of the kind mentioned in the introduction which is furthermore characterised in that it comprises an elevation element and a top connector element; that said elevation element is connected to the base connector element and supporting the top connector element so that the top connector element is positioned above the base connector element when seen in a height direction extending from the interior side towards the exterior side; that said top connector element comprises a top gutter with two longitudinal edges extending between a first end and a second opposite open end, where a length direction of the top connector element extends from the first end towards the second end; and that, when arranged on the elevation element, the top connector element is arranged with its second end above the gutter of the base connector element and with the length direction of the top connector element extending substantially in parallel to the length direction of the base connector element.

With the addition of the elevation element and the top connector element, the base connector element can be used for attaching and interconnecting top cover members used for covering the top frame members of the roof windows, while the top connector element can be used for attaching and interconnecting top flashing members spanning the gap between the wall and the top cover members. By the top and base connector elements being arranged at different heights, the top flashing members and top cover members become located at different levels and do not get in the way of each other. To cover the distance between the top connector element and the base connector element, the top flashing members can be provided with a leg projecting in the height direction toward the interior in the mounted state, but it also possible to provide additional cover or flashing members for this purpose.

Another advantage of the top flashing members and top cover members being located at different levels is that the base connector element can be embodied substantially in the same way as the base connector elements used in other roof window arrangement, which are not installed at a wall. This in turn means that the top cover members can be embodied in substantially the same way as those used on other roof windows of the roof window arrangement and/or in roof window arrangement not arranged adjacent to a wall.

Water penetrating through the flashing assembly or condensing at the interconnections between the top cover members can be drained off via the gutter in the base gutter and onto the roof window below it in the same way as in the prior art connector arrangement. Water penetrating through the flashing assembly or condensing at the interconnections between the top flashing members will be caught by the gutter in the top connector element and from there drip onto the exterior side of cover members of the flashing assembly or into the base gutter.

The fact that the length direction of the top connector element extends substantially in parallel to the length direction of the base connector element not only contributes to the draining function. It also entails that the connection between the top flashing members can extend substantially in parallel continuation of the connection between the top cover members, which may facilitate installation and/or provide aesthetic qualities to the roof window arrangement.

In order to allow the connector arrangement to be used with a range of the different mutual angles between the roof window slope and the surface of the wall, the top connector element may be displaceable in relation to the base connector element along the length direction of the base connector element. If, for example, the mutual angle between the roof window slope and the surface of the wall measured at the exterior side is relatively large, the first end of the top connector element can be moved away from the elevation element so that it can be arranged closely adjacent to the wall. If, on the other hand, the mutual angle between the roof window slope and the surface of the wall measured at the exterior side is small, the first end of the top connector element can be moved towards the elevation element. The ability to compensate for differences in the mutual angle between the roof window slope and the surface of the wall not only allows the use of the connector arrangement in different installation situations, where the roof window slope is intentionally different. It also allows the connector arrangement to compensate for unintentional differences in the mutual angle. It thus allows a bigger tolerance in the installation of the roof window arrangement. In addition, or alternatively, the connector arrangement may compensate for irregularities in the wall by two or more connector arrangements of a roof window arrangement being arrangement with their top connector elements at different positions relative to their respective base connector elements. By allowing a displacement of the top connector element relative to the base connector element even in the installed position it is even possible for the connector arrangement to compensate for relative movements between the roof window arrangement and the wall caused for example by thermal expansion.

By making the top connector element displaceable in relation to base connector element it is further possible to compensate for differences in the distance between the roof windows and the wall. Such differences for example may occur as a result of the use of different types of the mounting brackets, the use of insulating material on the roof windows, or properties of the wall. As described above with reference to the mutual angle between the roof window slope and the surface of the wall, differences in the distance may also be unintentional and be compensated for by top connector elements being arranged at different positions relative to their respective base connector elements.

In one embodiment the connector arrangement is delivered in an assembled state with a mutual position between the connector elements corresponding to a mutual angle between the roof window slope and the surface of the wall of 90 degrees and when the base connector element is in place the top connector element is then displaced until the first end abuts on the wall or an item attached thereto. In another embodiment the connector arrangement is delivered or brought into an assembled state with a mutual position between the connector elements corresponding to the intended mutual angle between the roof window slope and the surface of the wall and the connector arrangement is then used for validating the slope of the roof window arrangement.

A fixation mechanism for fixating the top connector element in relation to the elevation member and/or for fixating the elevation member in relation to the base connector element may be provided in order to ensure that the different parts of the connector arrangement stay in the intended mutual position. In one embodiment the fixation mechanism comprises a series of depressions on the top connector element and a corresponding projection provided on a flexible part of the elevation element adapted for engaging with one or a few of the depressions. By moving the elastic part of the elevation element away from the top connector element, the projection is brought out engagement with the top connector element, which may then be displaced. When the elastic part of the elevation element is released, the projection(s) will come into engagement with (an)other depression(s) and the fixation will be re-established. It is also possible to use one or more depressions on the elevation element and projections on the top connector element, and/or to have the series of depressions or projections on the elevation element and one or a few corresponding projections or depressions on the top connector element. In another embodiment, the fixation mechanism is a friction mechanism, where one or more elastics parts on elevation element presses against the top connector element or vice versa so that the friction between the materials of the two elements prevents them from moving in relation to each other.

In one embodiment, the elevation member is formed in one with the base connector element. This reduces the number of separate parts of the connector arrangement and hence the risk of erroneous use. In another embodiment the elevation element is integrated in the top connector element and moveable as described above in relation to the base connector element. In a still further embodiment the elevation element is a separate element, which may potentially be moveable in relation to both the top connector element and the base connector element.

The top connector element may comprise a series of attachment sections adapted for use in the attachment of a flashing member to the top connector element. This allows for the attachment of different types of flashing and/or cover members and/or for the attachment of flashing and/or cover members at different positions depending on the distance and the mutual angle between the roof window slope and the surface of the wall. As an example, the top flashing members used when the mutual angle is small will have a relatively small width and may require attachment only at one or two places, whereas the top flashing members used when the mutual angle is high will have a larger width and may require attachment at three or more places. The attachment section may for example be a reception section adapted for receiving a fastener, such as a screw.

A further or supplemental way of increasing the versatility of the connector arrangement is to use a top connector element comprising one or more weakenings and/or separation guides adapted for aiding in the removal of a part of the top connector element. In this way the top connector element can be supplied in a length allowing it to be used with a maximum allowable mutual angle between the roof window slope and the surface of the wall and can easily be made shorter corresponding to smaller mutual angles between the roof window slope and the surface of the wall. By providing a series of weakenings and/or separation guides along the length of the top connector element, those suitable for a particular angle can be used. Angle indications on the top connector element may help to decide which weakenings and/or separation guides to use. The removal of a part of the top connector element may result in the removal of one or more attachment sections.

In a second aspect of the invention the object is achieved with a method for weather proofing a roof window arrangement using a connector arrangement, said method comprising the following steps:

A) attaching a base connector element to a bracket used for connecting a roof window to a load-bearing structure using an attachment section on an interior side of the base connector element so that an exterior side of the base connector element faces the exterior and so that an elevation element connected to or integrated with the base connector element projects from the base connector element in a height direction extending from the interior side towards the exterior side, where said base connector element has a length direction extending from a first end towards a second end, and said exterior side comprises a base gutter with two longitudinal edges extending between the first and second ends, and where the base gutter is open at the second end so that water can drain out of the base gutter, B) arranging a top connector element on the elevation element so that the top connector element is positioned above the base connector element when seen in the height direction, where said top connector element comprises a top gutter with two longitudinal edges extending between a first end and a second opposite open end, where a length direction of the top connector element extends from the first end towards the second end, and so that the top connector element is arranged with the second end above the gutter of the base connector element and with the length direction of the top connector element extending substantially in parallel to a length direction of the base connector element, C) attaching two cover or flashing members of a flashing assembly to the base connector element so that an edge of each cover or flashing member extends along a longitudinal edge of the base gutter, and D) attaching two cover or flashing members of a flashing assembly to the top connector element so that an edge of each cover or flashing member extends along a longitudinal edge of the top gutter.

Unless otherwise stated the embodiments and advantages described above with reference to the first aspect of the invention, i.e. the connector arrangement, also applies to the method and vice versa.

BRIEF DESCRIPTION OF DRAWINGS

In the following description embodiments of the invention will be described with reference to the schematic drawings, in which.

DESCRIPTION OF EMBODIMENTS

Figure 1:
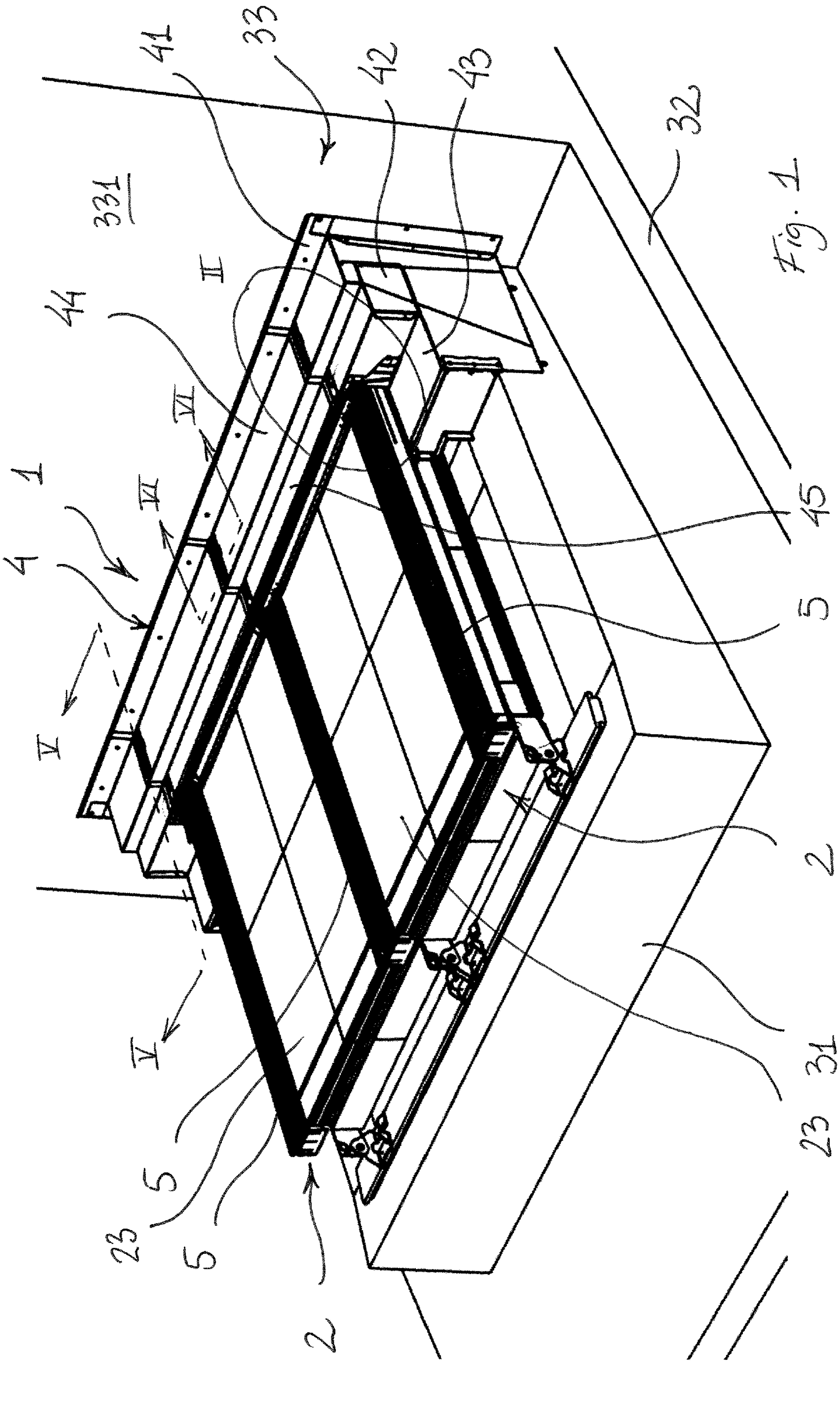
FIG. 1 is a perspective view of a roof window arrangement including two roof windows installed side by side with parts of the flashing assembly removed.

Referring initially to FIG. 1, a roof window arrangement 1 including two roof windows 2 installed side by side on an upstand 31 forming part of a roof structure 32 and adjacent to a wall 33. The joints between the roof windows and the upstand and the wall are covered by a flashing assembly 4 comprising a plurality of cover and flashing members, where the cover members cover the joints between flashing members and the roof windows. In FIG. 1 only the cover and flashing members 41-45 used at the top of the roof window arrangement are shown, but it is to be understood that the sides and bottoms of the two roof windows will also be covered in the finished state of the roof window arrangement. The joints between windows are covered by cladding members 5.

Figure 2:
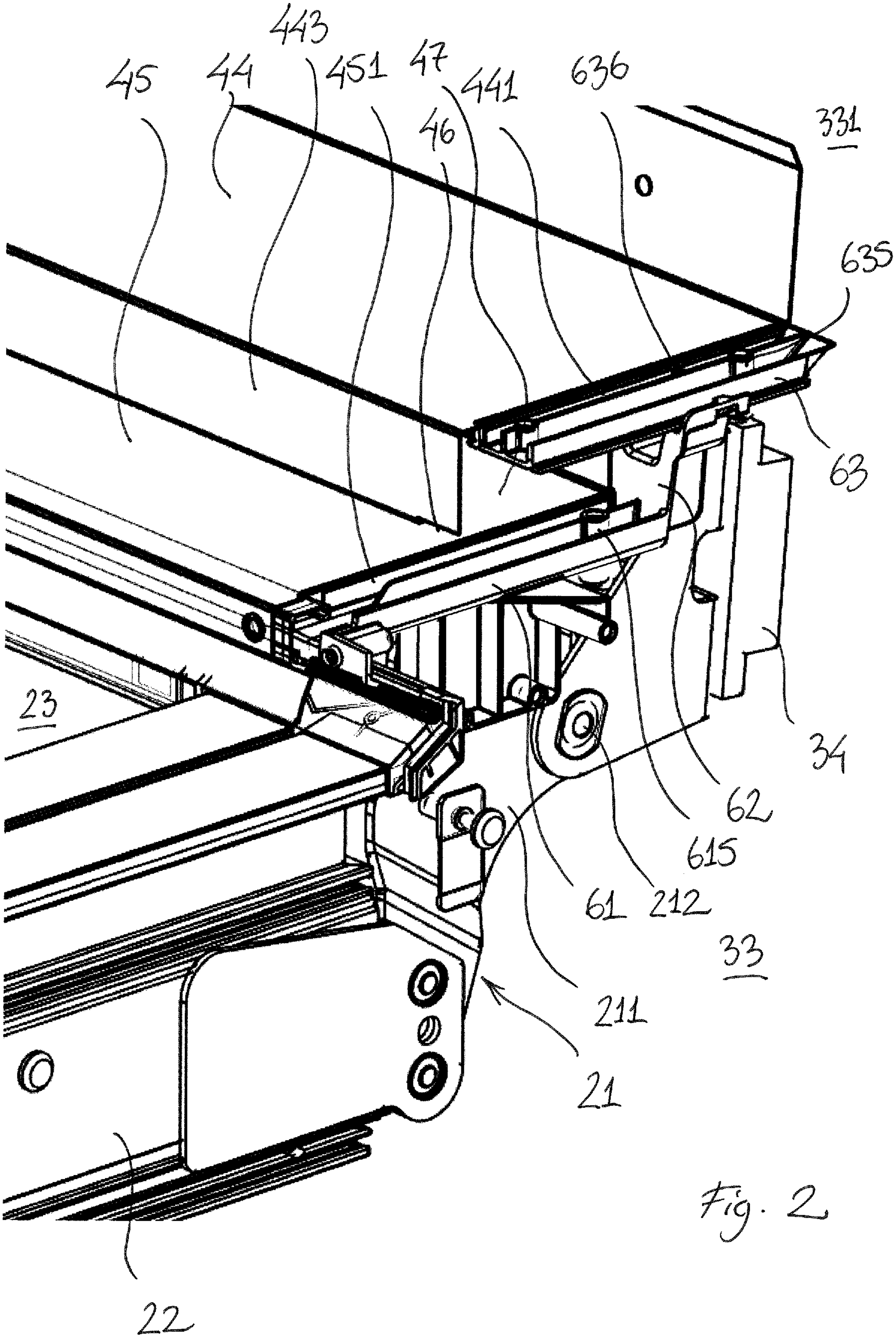
FIG. 2 is a perspective view of the detail marked II in FIG. 1 with parts of the flashing assembly removed.

The detail marked II in FIG. 1 is shown in FIG. 2 with the top corner flashing member 41, top corner cover member 42, and side flashing member 43 removed, so that the connector arrangement 6 used for attaching and interconnecting the top cover and flashing members is exposed. The connector arrangement 6 is shown alone in FIGS. 3 and 4 and a cross-sectional view along the centre line of an identical connector arrangement is shown in FIG. 5.

The connector arrangement 6 comprises a base connector element 61 with an integrated elevation element 62 and a top connector element 63 attached to the elevation element. The base connector element 61 is attached to a mounted bracket assembly 21 used for connecting the frame 22 of the roof window to a beam 34 attached to the wall 33. The base connector element 61 lacking the elevation element 62 is similar to the connector element 6 disclosed in the co-pending European patent application no. EP3680416A1 and U.S. Pat. No. 11,002,016, the description of which in U.S. Pat. No. 11,002,016 is hereby incorporated by reference, and its attachment to the mounting bracket will therefore not be described in further detail here.

Figure 3:
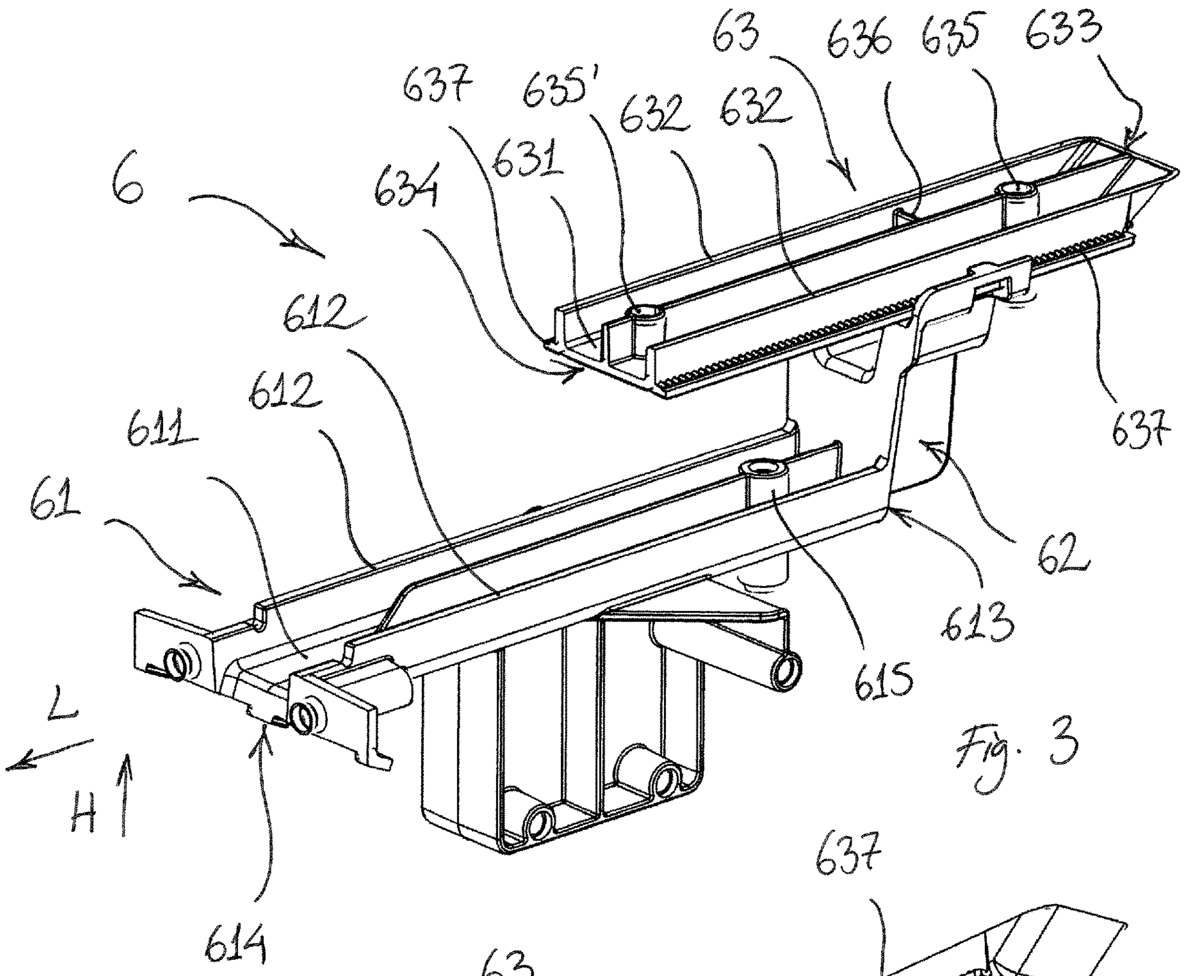
FIG. 3 is a perspective view of the connector arrangement used in FIG. 2 seen from the exterior.
Figure 4:
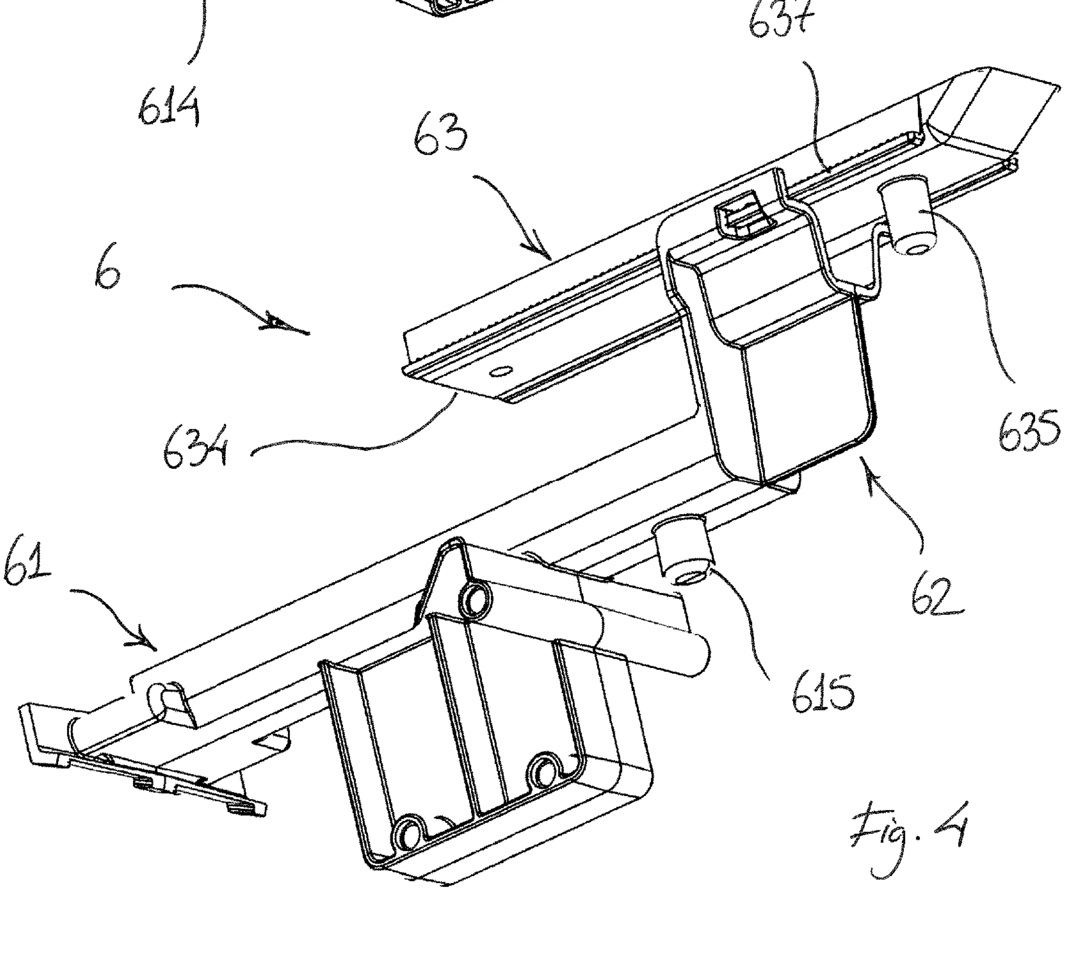
FIG. 4 is a perspective view of the connector arrangement used in FIG. 2 seen from the interior.
Figure 5:
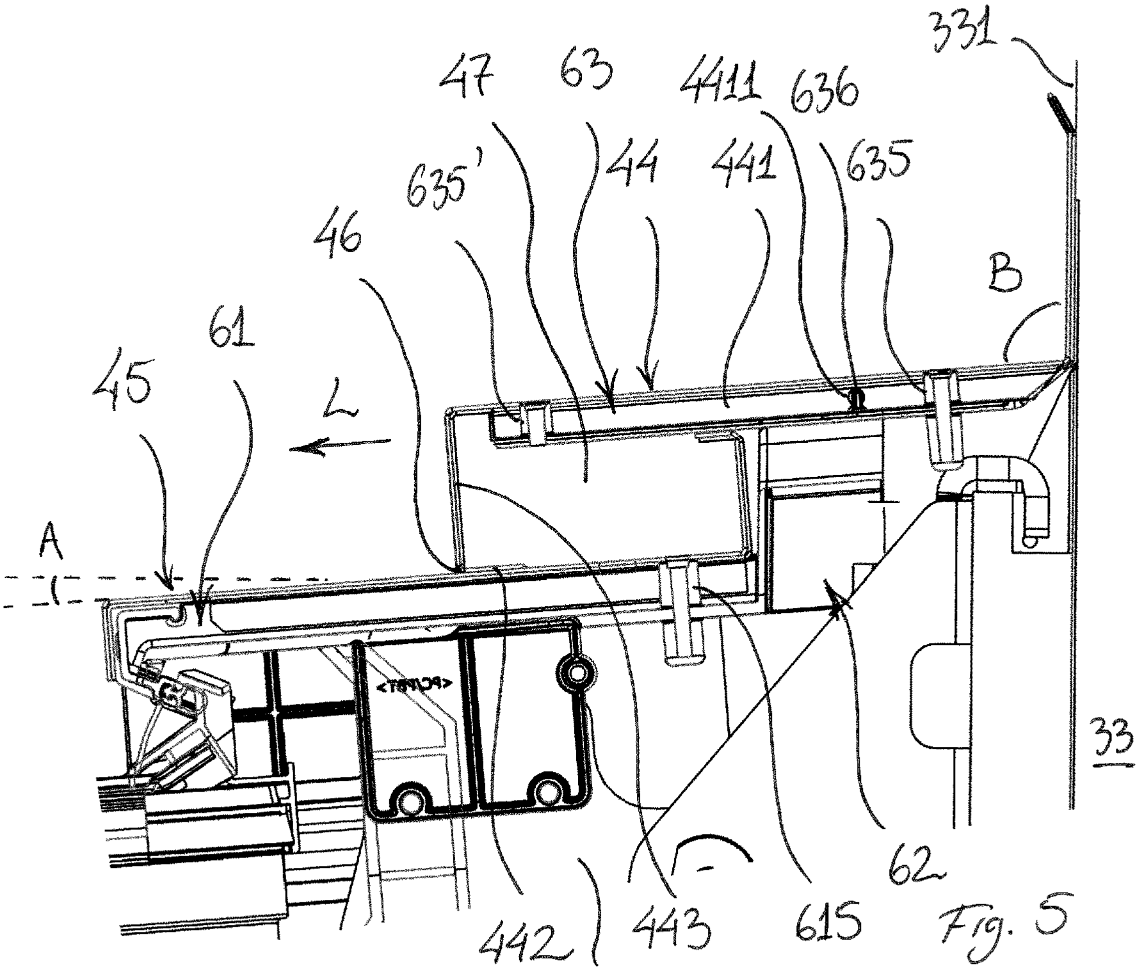
FIG. 5 is a cross-sectional perspective view along the line V-V in FIG. 1.

As is best seen in FIGS. 3 and 4, both connector elements 61, 63 have a gutter 611, 631 in their exterior sides, each of said gutters being delimited by two longitudinal edges 612, 632 extending a length direction L between a first end 613, 633 and an opposite second end 614, 634, where the gutter is open so that water can drain out of the gutter. In this case the length directions of the two connector elements 61, 63 extend in parallel and they thus share a common length direction L. In the mounted state the connector elements are both arranged with a slight inclination towards the second end, said inclination corresponding substantially to the slope of the roof windows, i.e. to the inclination of the panes 23 of the roof windows in the mounted state.

By being arranged on the elevation element 62, the top connector element 63 is positioned above the base connector element 61 when seen in a height direction H extending from the interior side towards the exterior side.

Figure 6:
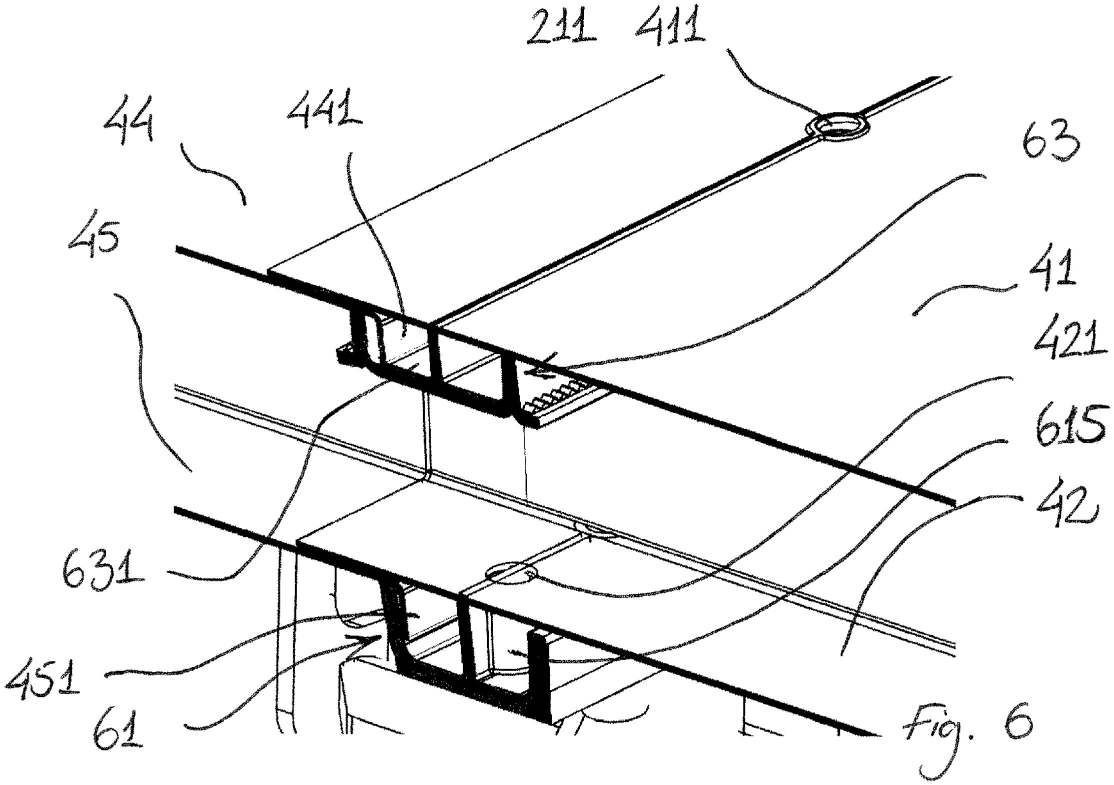
FIG. 6 is a cross-sectional perspective view along the line VI-VI in FIG. 1.

Referring now also to FIGS. 5 and 6, the top connector element 63 is used for attachment and interconnection of the top flashing member 44 and the top corner flashing members 41. In this embodiment a bent edge 441 of the top flashing member 44 projects into the top gutter 631 and the top corner flashing members 41 overlaps both the top connector element 63 and a section of the top flashing member 44. By passing a screw or like fastener (not shown) through the opening 411 in the top corner flashing members 41 and into a reception section 635 of the top connector element 63, the top corner flashing members 41 is attached to the top connector element 63 and the top flashing member 44 is fixated by being clamped between them. In the same way, the base connector element 61 is used for attachment and interconnection of the top cover member 45 and the top corner cover members 42, by the top cover member 45 being provided with a bent edge 451 projecting into the base gutter 611 and the top corner cover members 42 having an opening 421 for receiving a fastener directly above a reception section 615 of the base connector element 61.

In this embodiment the top connector element 63 is provided with a wall section 636 extending perpendicular from the longitudinal edge 632 as is best seen in FIGS. 3 and 4. This wall section matches an indentation 4411 in the bent edge 441 of the top flashing member 44 as seen in FIG. 5 and thus prevents the top flashing member from moving in the length direction in relation to the top connector element.

Any water penetrating through the joint between the top cover member 45 and the top corner cover members 42 or through the opening 421 or condensing on the interior side of the flashing assembly at the joint will be caught in the base gutter 611. Likewise, water penetrating or condensing at the joint between the top corner flashing members 41 and the top flashing member 44 will be caught in the top gutter 631. As best seen in FIG. 5, water draining out of the top gutter 631 will drip onto the cover members 42, 45 from where it can be let drained off. In this embodiment, the top flashing member 44 is provided with a small drainage opening 46 at the overlap with the top corner flashing member 41, said drainage opening 46 allowing water to exit the space 47 formed between the top flashing member 44 and the top cover member 45 underneath the section of the top connector element 63, which extends from the elevation element 62 to the second end. It is, however also possible to make the top flashing member without the section 442 extending along the exterior surface of the top cover member 45 and with a free edge (no shown) of the inwards section 443 ending slightly the exterior surface of the top cover member so that water may pass underneath the free edge.

In the embodiment shown in FIGS. 1, 2 and 5 the exterior surface 331 of the wall 33 is substantially vertical and the exterior surface of the panes 23 of the roof windows slope with an angle A of 5 degrees in relation to the horizontal plane. This means that the mutual angle B between the roof window slope and the surface of the wall is 95 degrees.

If the mutual angle B between the roof window slope and the surface of the wall becomes larger, the centre part 211 of the mounting bracket assembly 21 and hence the entire connector arrangement 6 will turn about the joint 212 of the mounting bracket assembly which is seen in FIG. 2. This will result in the distance between the elevation element 62 and the wall 33 becoming larger. To compensate for this, the top connector element 63 is displaceable in relation to the elevation element 62 in the length direction L.

Figure 7:
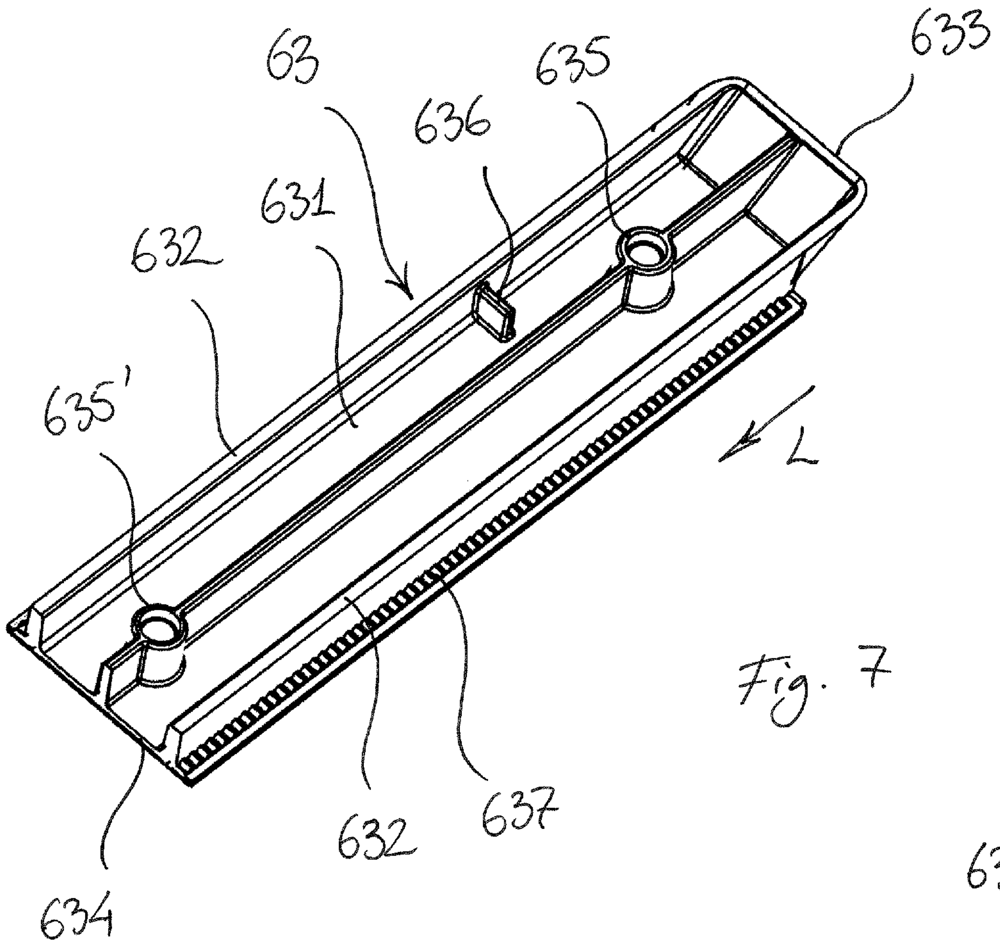
FIG. 7 is a perspective view of the top connector element of FIGS. 3 and 4 seen from the exterior.
Figure 10:
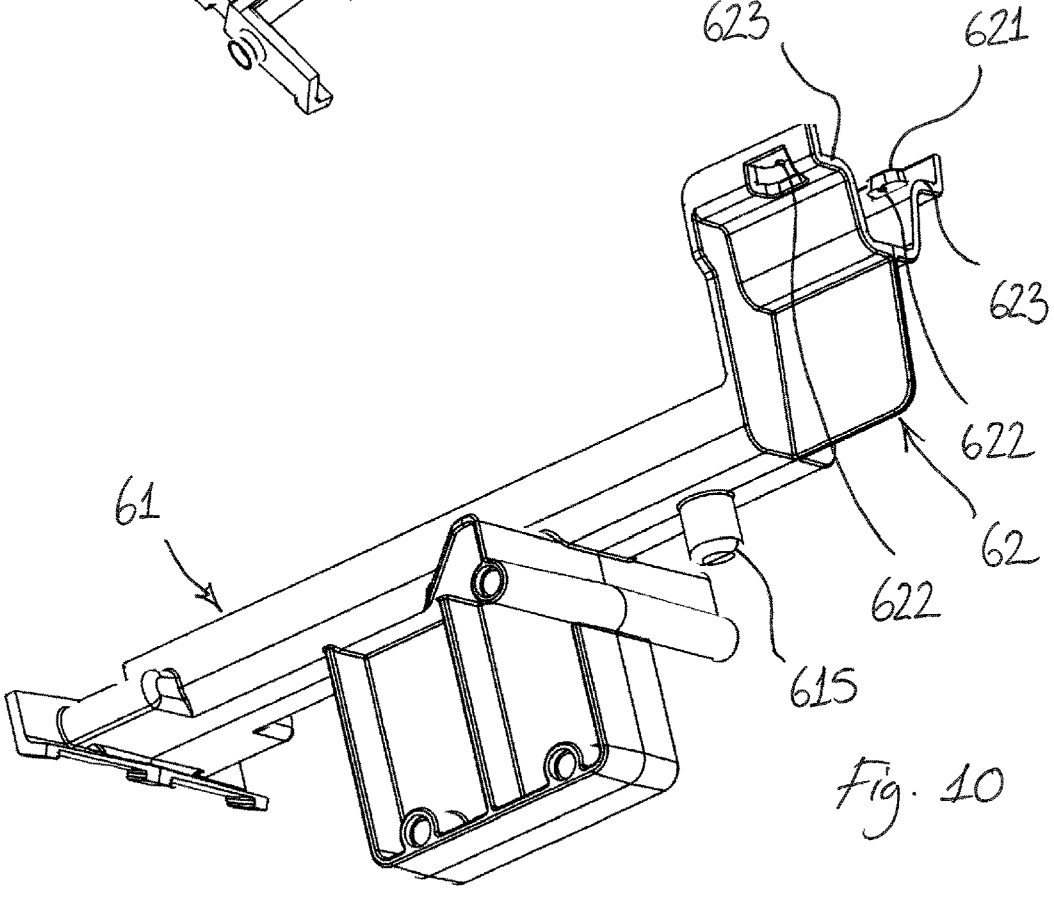
FIG. 10 is a perspective view of the base connector element and elevation element of FIGS. 3 and 4 seen from the interior.

In this embodiment this is achieved by the top connector element 63 being provided with a toothed rack 637 extending in the length direction along each side of the top gutter 631 as is best seen in FIGS. 3 and 7 and the elevation element 62 being provided with a tooth 622 on a projection 621 as is best seen in FIG. 10. In the mounted state of the connector arrangement 6, which is shown in FIGS. 3 and 4, the top connector element is arranged on the elevation element with each toothed rack extending between a projection 621 and an exterior surface 623 of the elevation element. The teeth 622 on the two sides of the elevation element mate with the tooted racks and thus retain the top connector element at two points, one on each side of the top connector element. The projections 621 on the elevation element are preferably slightly elastic so that they may be forced away from the exterior surface 623 and allow an intentional movement of the toothed racks 637 in the length direction. While only one tooth is shown on each projection 621, it is to be understood that each projection may comprise more than one, and the use of other means for engagement between the elevation element and the top connector element, such as a hook-and-loop type fastener like Velcro, or the use of friction, is also envisaged.

Figure 11:
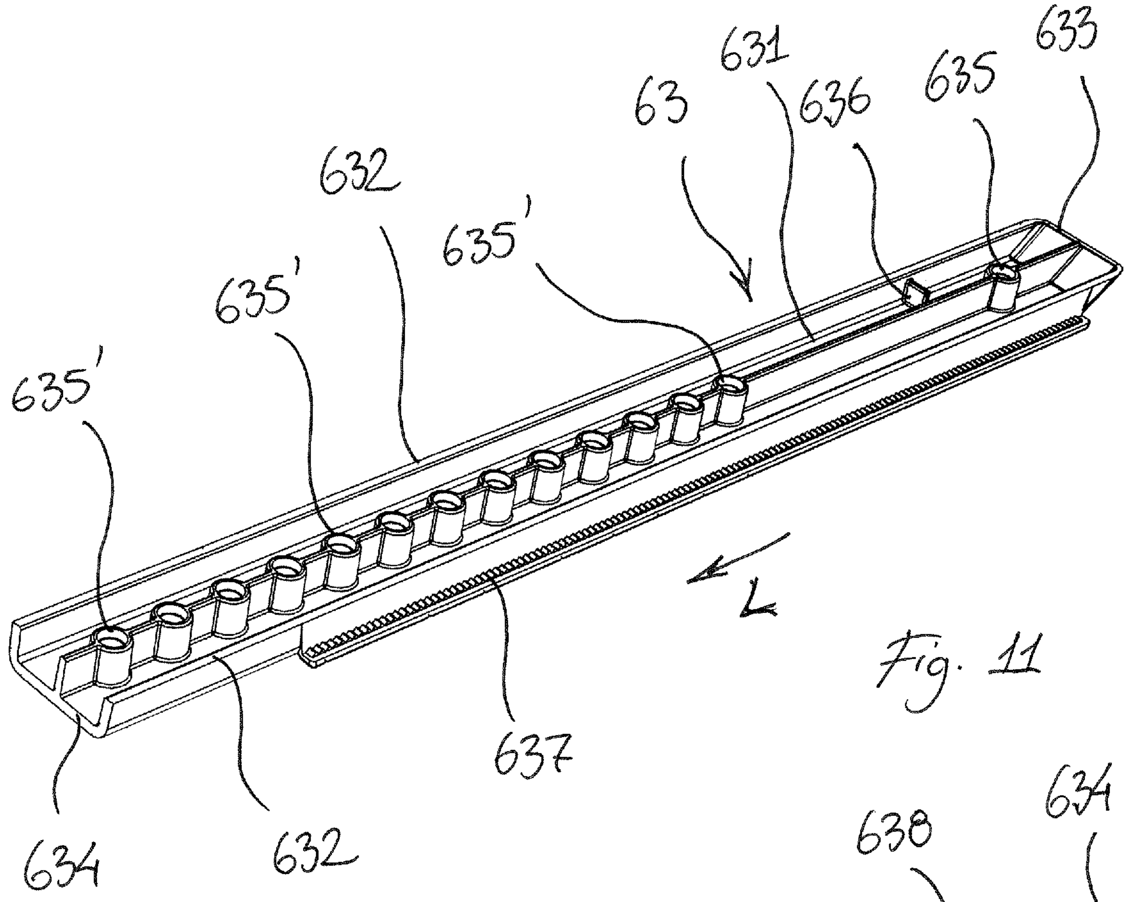
FIG. 11 is a perspective view of another embodiment of the top connector element seen from the exterior side.
Figure 12:
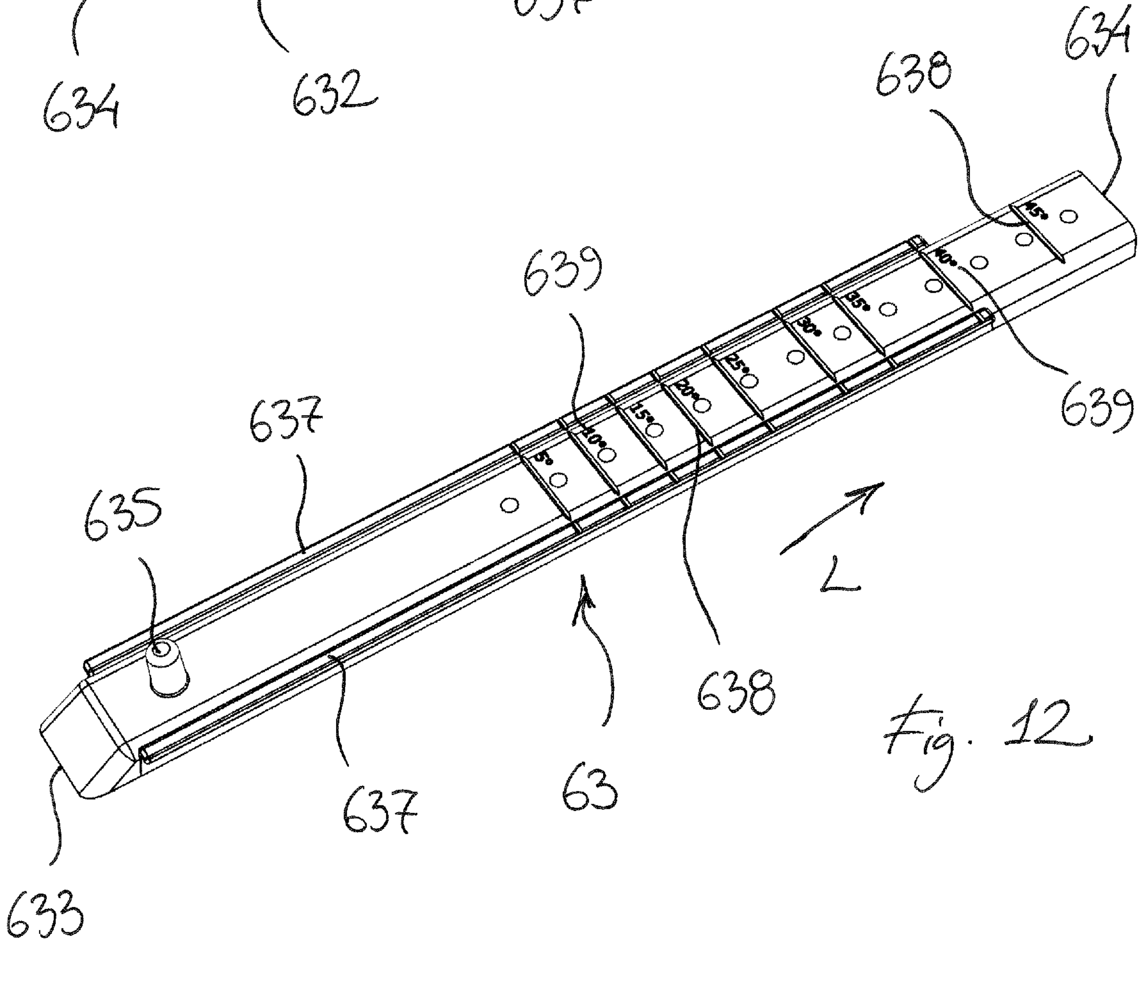
FIG. 12 is a perspective view of the top connector element in FIG. 11 seen from the interior side.

A second embodiment of the top connector element 63 is shown in FIGS. 11 and 12. The same reference numbers will be used in these figures as in the other figures for features having the same function, even though they may not be identical.

The top connector element 63 in FIGS. 11 and 12 is considerably longer than the one in FIGS. 2-7 and configured for being shortened depending on the mutual angle B between the roof window slope and the surface of the wall. For this purpose, it is provided with a series of reception sections 635, 635' along the top gutter 631 and with a series of weakenings 638 on the interior side as shown in FIG. 12.

The weaknings 638 allow the top connector element 63 to be shortened depending on the installation situation, either by breaking it by hand or by using a tool for breaking or cutting it along a weakening. In this case the weakenings are line-shaped, but it might also be a series of holes or depressions. Alternatively, the weakenings may be replaced with separation guides, such as cutting-indications, for example in the form of printed lines.

Angle indications 639 indicating respective roof window slope angles are provided at each weakening. Here the angle indications are in the form of number indicating the roof window slope, but other types of indications, such as colour codes, may also be used.

Figure 8:
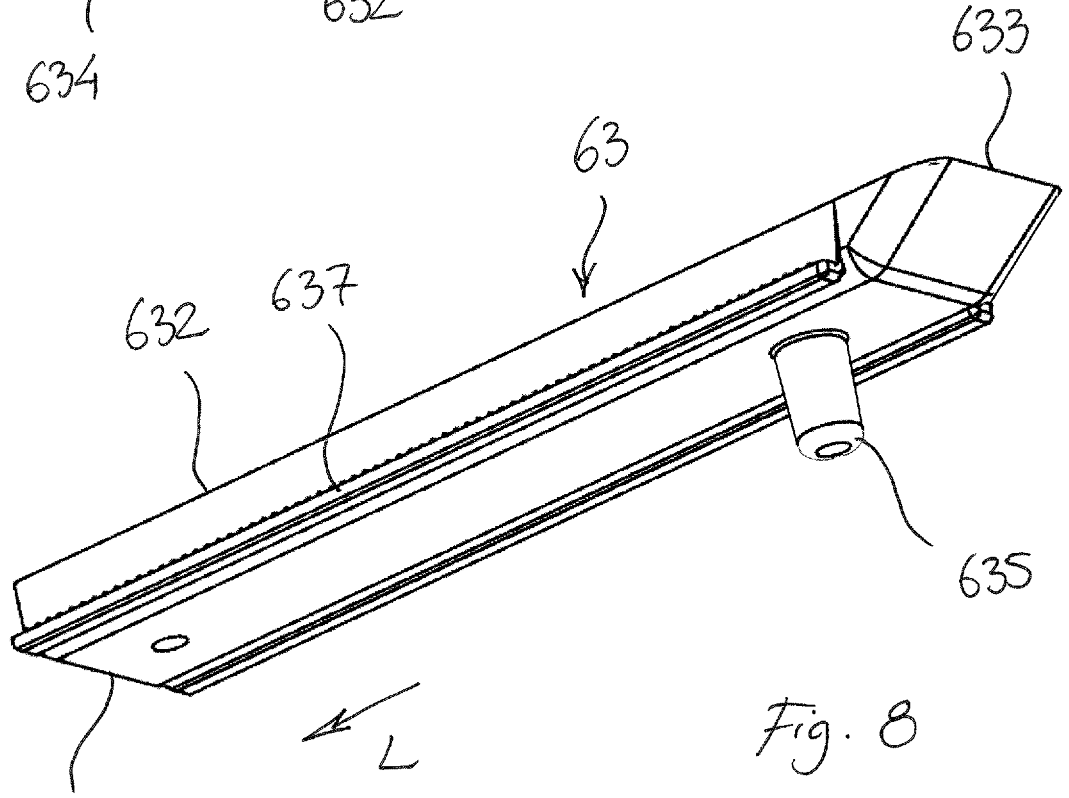
FIG. 8 is a perspective view of the top connector element of FIGS. 3 and 4 seen from the interior.
Figure 9:
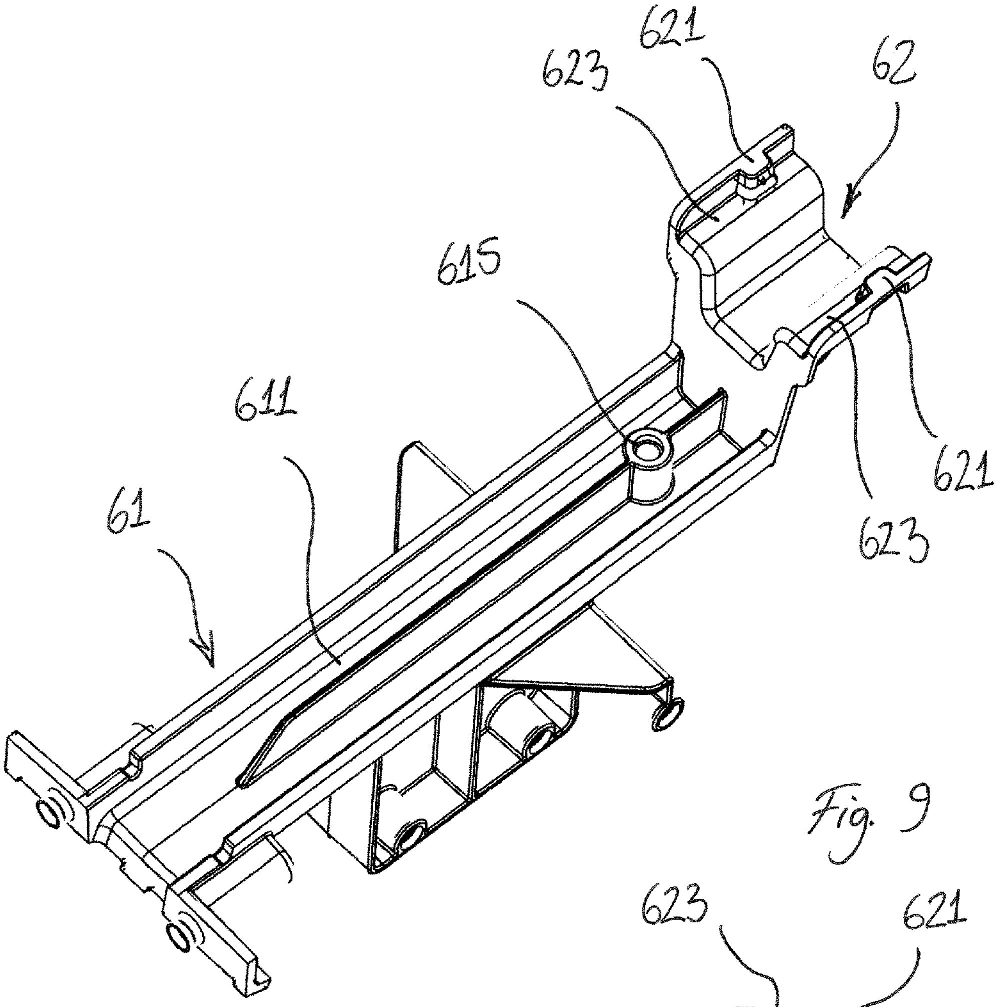
FIG. 9 is a perspective view of the base connector element and elevation element of FIGS. 3 and 4 seen from the exterior.

When the top connector element 63 has been shortened, the part of the top connector element located at the right-hand side in FIG. 11 is used as described with reference to FIGS. 1-9 above while the part at the left-hand side in FIG. 11 is discharged. When shortened for use with a 5 degrees roof window slope, the top connector element 63 will look as shown in FIGS. 7 and 8 where only two reception sections 635, 635' are left. If shortened for use with a larger roof window slope, several of the reception section marked 635' will be left, but only one or two of them will be used depending on the total remaining length of the top connector element and the need for securing the top flashing member(s) 44 and/or top corner flashing member 41.

LIST OF REFERENCE NUMERALS

1 roof window arrangement
2 roof window
21 mounted bracket assembly
211 centre part
212 joint
22 frame
23 pane
31 upstand
32 roof structure
33 wall
331 exterior surface
34 beam
4 flashing assembly
41 top corner flashing member
411 opening

42 top corner cover member
421 opening
43 side flashing member
44 top flashing member
441 bent edge
4411 indentation
442 section extending along exterior surface
443 inwards section
45 top cover member
451 bent edge
46 drainage opening
47 space
5 cladding members
6 connector arrangement
61 base connector element
611 gutter
612 longitudinal edge
613 first end
614 second end
615 reception section
62 elevation element
621 projection
622 tooth
623 exterior surface
63 top connector element
631 gutter
632 longitudinal edge
633 first end
634 second end
635 reception section
635' reception section
636 wall section
637 toothed rack
638 weakening
639 angle indication
A roof window slope angle
B mutual angle between the roof window slope and surface of wall
H height direction
L length direction

The invention claimed is:

1. A connector arrangement for a flashing assembly for use in a roof window arrangement, said connector arrangement comprising a base connector element configured for being arranged with an exterior side facing an exterior in a mounted state, an interior side opposite the exterior side, and a length direction of the base connector element extending from a first end towards a second end, where the exterior side comprises a base gutter with two longitudinal edges extending between the first and second ends, where the base gutter is open at the second end so that water can drain out of the base gutter, and where an attachment section on the interior side is configured for being attached to a bracket used for connecting a roof window to a load-bearing structure, the connector arrangement further comprises an elevation element and a top connector element, said elevation element is connected to the base connector element and supporting the top connector element so that the top connector element is positioned above the base connector element when seen in a height direction extending from the interior side towards the exterior side, said top connector element comprises a top gutter with two longitudinal edges extending between a first end and a second opposite open end, where a length direction of the top connector element extends from the first end towards the second opposite open end of said top connector, and when arranged on the elevation element, the top connector element is arranged with its second opposite open end above the gutter of the base connector element and with the length direction of the top connector element extending substantially in parallel to the length direction of the base connector element wherein a first plane extending parallel to an inclination of a roof and passing through a bottom of said top gutter is disposed above a second plane extending parallel to the inclination of the roof and passing through an uppermost portion of said base gutter.

2. The connector arrangement according to claim 1, where the top connector element is displaceable in relation to the base connector element along the length direction of the base connector element.

3. The connector arrangement according to claim 2, further comprising a fixation mechanism for fixating the top connector element in relation to the elevation member and/or for fixating the elevation member in relation to the base connector element.

4. The connector arrangement according to claim 3, where the elevation member and the base connector element are formed as a single piece.

5. The connector arrangement according to claim 3, where the top connector element comprises a series of attachment sections adapted for use in the attachment of a flashing member to the top connector element.

6. The connector arrangement according to claim 3, where the top connector element comprises one or more weakenings and/or separation guides adapted for aiding in the removal of a part of the top connector element.

7. The connector arrangement according to claim 2, where the elevation member and the base connector element are formed as a single piece.

8. The connector arrangement according to claim 2, where the top connector element comprises a series of attachment sections adapted for use in the attachment of a flashing member to the top connector element.

9. The connector arrangement according to claim 2, where the top connector element comprises one or more weakenings and/or separation guides adapted for aiding in the removal of a part of the top connector element.

10. The connector arrangement according to claim 1, where the elevation member and the base connector element are formed as a single piece.

11. The connector arrangement according to claim 10, where the top connector element comprises a series of attachment sections adapted for use in the attachment of a flashing member to the top connector element.

12. The connector arrangement according to claim 10, where the top connector element comprises one or more weakenings and/or separation guides adapted for aiding in the removal of a part of the top connector element.

13. The connector arrangement according to claim 1, where the top connector element comprises a series of attachment sections adapted for use in the attachment of a flashing member to the top connector element.

14. The connector arrangement according to claim 13, where the top connector element comprises one or more weakenings and/or separation guides adapted for aiding in the removal of a part of the top connector element.

15. The connector arrangement according to claim 1, where the top connector element comprises one or more weakenings and/or separation guides adapted for aiding in the removal of a part of the top connector element.

16. A method for weather proofing a roof window arrangement using a connector arrangement for a flashing assembly wherein the connector arrangement includes a base connector element, an elevation element and a top connector element, said method comprising the following steps:

A) attaching the base connector element of the connector arrangement to a bracket used for connecting a roof window to a load-bearing structure using an attachment section on an interior side of the base connector element so that an exterior side of the base connector element faces an exterior and so that an elevation element of the connector arrangement is connected to or integrated with the base connector element and projects from the base connector element in a height direction extending from the interior side towards the exterior side, where said base connector element has a length direction extending from a first end towards a second end, and said exterior side comprises a base gutter with two longitudinal edges extending between the first and second ends, and where the base gutter is open at the second end so that water can drain out of the base gutter, B) arranging the top connector element of the connector arrangement on the elevation element so that the top connector element is positioned above the base connector element when seen in the height direction, where said top connector element comprises a top gutter with two longitudinal edges extending between a first end and a second opposite open end, where a length direction of the top connector element extends from the first end towards the second opposite open end of said top connector, and so that the top connector element is arranged with the second opposite open end above the gutter of the base connector element and with the length direction of the top connector element extending substantially in parallel to a length direction of the base connector element, C) attaching two cover or flashing members of the flashing assembly to the base connector element of the connector arrangement so that an edge of each cover or flashing member extends along a longitudinal edge of the base gutter, and D) attaching two cover or flashing members of the flashing assembly to the top connector element of the connector arrangement so that an edge of each cover or flashing member extends along a longitudinal edge of the top gutter.

17. The method according to claim 16, where, during step B) the top connector element is displaced in the length direction in relation to the elevation element.

18. The method according to claim 16, further comprising the step of:

E) removing a part of the top connector element, step E) being performed before or during step B).

19. A method according to claim 18, further comprising the step of:

F) fixating the top connector element in relation to the elevation element, step F) being performed before or during step B).

* * * * *